United States Patent [19]

Oka

[11] 4,406,996
[45] Sep. 27, 1983

[54] INTENSITY COMPENSATOR CIRCUIT FOR OPTICAL SENSOR IN BANK NOTE MACHINE

[75] Inventor: Yoshinobu Oka, Tokyo, Japan

[73] Assignee: Laurel Bank Machine Co., Ltd., Tokyo, Japan

[21] Appl. No.: 277,602

[22] Filed: Jun. 26, 1981

[30] Foreign Application Priority Data

Jun. 27, 1980 [JP] Japan .................................. 55-87580

[51] Int. Cl.³ ............................................. G08B 21/00
[52] U.S. Cl. .................................... 340/674; 250/205; 340/600
[58] Field of Search ................. 340/674, 600, 501; 250/205, 561, 571

[56] References Cited

U.S. PATENT DOCUMENTS

| 3,670,202 | 6/1972 | Paine et al. | 250/205 |
| 4,260,882 | 4/1981 | Barnes | 250/205 |
| 4,268,746 | 5/1981 | Schroeder | 340/674 |

FOREIGN PATENT DOCUMENTS 52-131794  11/1977  Japan .

Primary Examiner—Glen R. Swann, III

Attorney, Agent, or Firm—Fleit, Jacobson, Cohn & Price

[57] ABSTRACT

An optical detection device particularly suitable for use in a bank note counting apparatus is provided. By the use of the optical detection device of this invention, the influence of dust or change in power of the light emitting element due to change in temperature or other factors is excluded to maintain the quantity of light received by the light receiving element at a constant level. The control circuit incorporated in the device of this invention includes a comparator for comparing the quantity of light actually received or sensed by the light receiving element with the pre-set value to generate an output signal instructing to stepwisely lower the power of the light emitting element. In actual operation, the power of the light emitting element is firstly raised to the maximum value and then stepwisely lowered to the same value as that pre-set by the operator. The control circuit further includes a control for controlling the power of the light emitting element to an optimum level in response to the output signal generated from the comparator. The device of this invention may have an alarm signal generator and an alarm signal display device for indicating the occurrence of jamming of any bank note.

5 Claims, 6 Drawing Figures

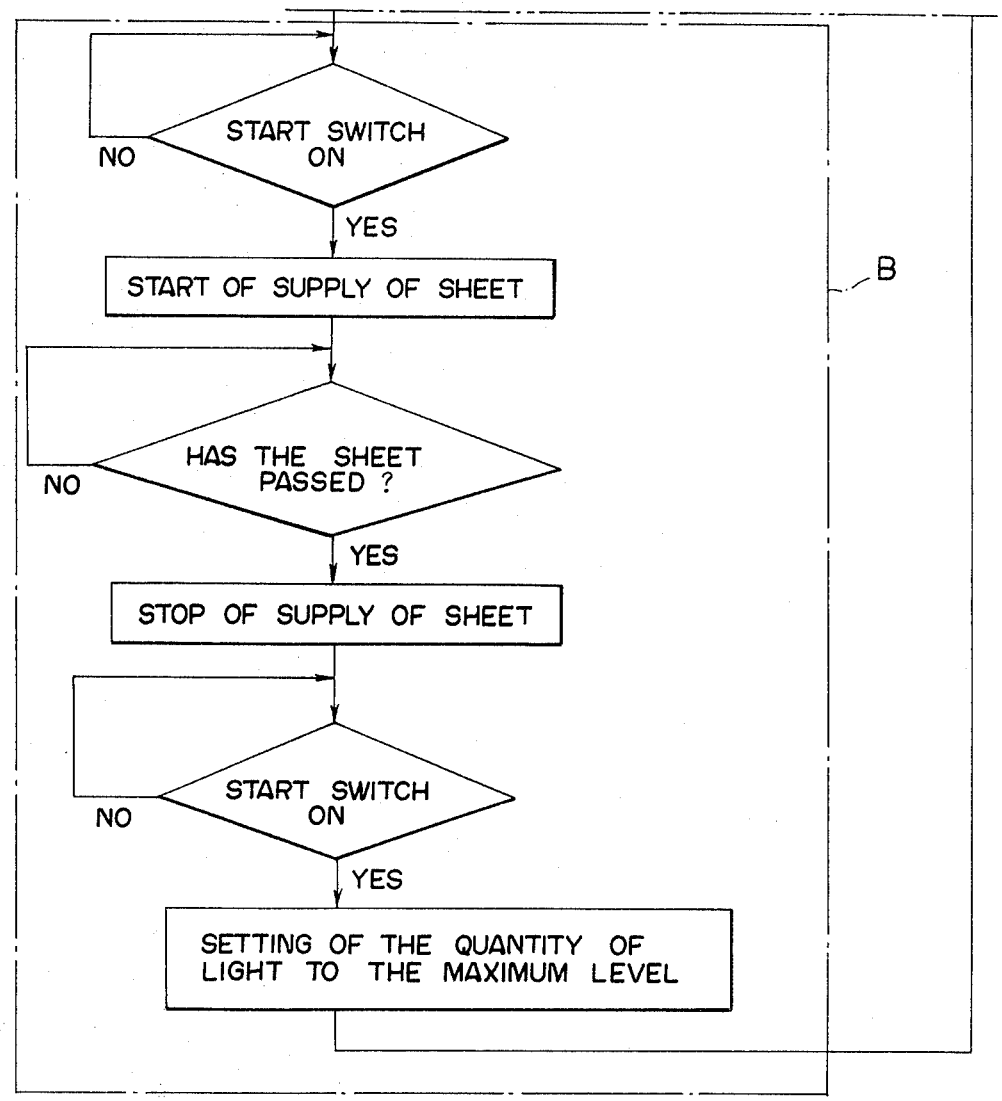

INTENSITY COMPENSATOR CIRCUIT FOR OPTICAL SENSOR IN BANK NOTE MACHINE

BACKGROUND OF THE INVENTION

1. Field of the Invention

This invention relates generally to a sheet material counting apparatus, and particularly to an optical detection device for use in a bank note counting apparatus wherein the influence of dust or change in temperature is excluded to maintain the quantity of light received by the light receiving element at a constant level.

2. Prior Art

There has been known in the art a device for detecting a passing bank note by the provision of a light emitting element arranged along the bank note passage and a light receiving element disposed opposite the light emitting element to detect the passing bank note by sensing the change in the output from the light emitting element.

However, in a known device of this type, the quantity of light incident on the light receiving element might be reduced by the adhesion of dust to the light emitting or receiving element of by change in characteristic features of the light emitting or receiving element due to temperature change. As a result, the detection level of the receiving element might be shifted, leading to erroneous operation of the device.

In order to obviate this erroneous operation due to reduction in the quantity of light incident on the light receiving element, there has been proposed a device wherein the quantity of light received by the light receiving element (the quantity of light being converted into the light receipt output voltage), when no bank note interrupts the path of light from the light emitting element to the light receiving element, is sample-held as the standard quantity of light (standard light receipt output voltage); and the divided value of this standard voltage is compared to the quantity of light (which is converted into an output voltage) sensed at the passage of bank note to thereby know the presence or absence of bank note.

Another improvement was proposed by the Japanese Patent Application No. 48806/1976. The improved device proposed by the application comprises a detector for detecting the reduction in quantity of light sensed by the light receiving element, an amplifier for compensating the reduction in quantity of light, and means for automatically increasing the gain of the amplifier based on the output from the detector thereby to retain the electrical detection level at a constant value.

However, these improved devices, which have been previously proposed, have a common disadvantage that the output voltage from the light receiving element cannot be differentiated from the noise voltage when the quantity of light sensed by the light receiving element is decreased extremely, for example, due to dust or paper scraps adhering to either the light emitting or receiving element, making it difficult to conduct the comparison and discrimination operations.

SUMMARY AND OBJECT OF THE INVENTION

The principal object of this invention is to provide an optical detection device in which the quantity of light received by the light receiving element, when the bank note is not passing through the element, is maintained at a constant level.

Another object of this invention is to provide an optical detection device in which an erroneous detection result due to adhesion of dust or change in performance characteristics of either the light emitting or receiving element can be excluded.

A further object of the invention is to provide an optical detection device in which the electrical detection level is not changed even if a light from an external source other than the light emitting element is incident on the light receiving element.

The above and other objects of this invention will be attained, according to this invention, by the provision of an optical detection device comprising a light emitting circuit for emitting a quantity of light, a light receiving circuit for receiving the light emitted from said light emitting circuit, a comparator for comparing the quantity of light received by said light receiving means with the pre-set level to generate an output signal instructing the stepwise lowering of the power of said light emitting circuit, and a control for controlling the power of said light emitting circuit in response to the output signal generated from said comparator.

DESCRIPTION OF THE DRAWINGS

FIGS. 3(a) and 3(b) constitute a flow chart showing the operation of the optical detection device according to this invention.

FIG. 4 depicts the logical connection between the flow diagrams of FIGS. 3(a) and 3(b).

DESCRIPTION OF THE PREFERRED EMBODIMENT

The features and advantages of this invention will become apparent from the following detailed description of the preferred embodiment with reference to the accompanying drawings.

Figure 1:
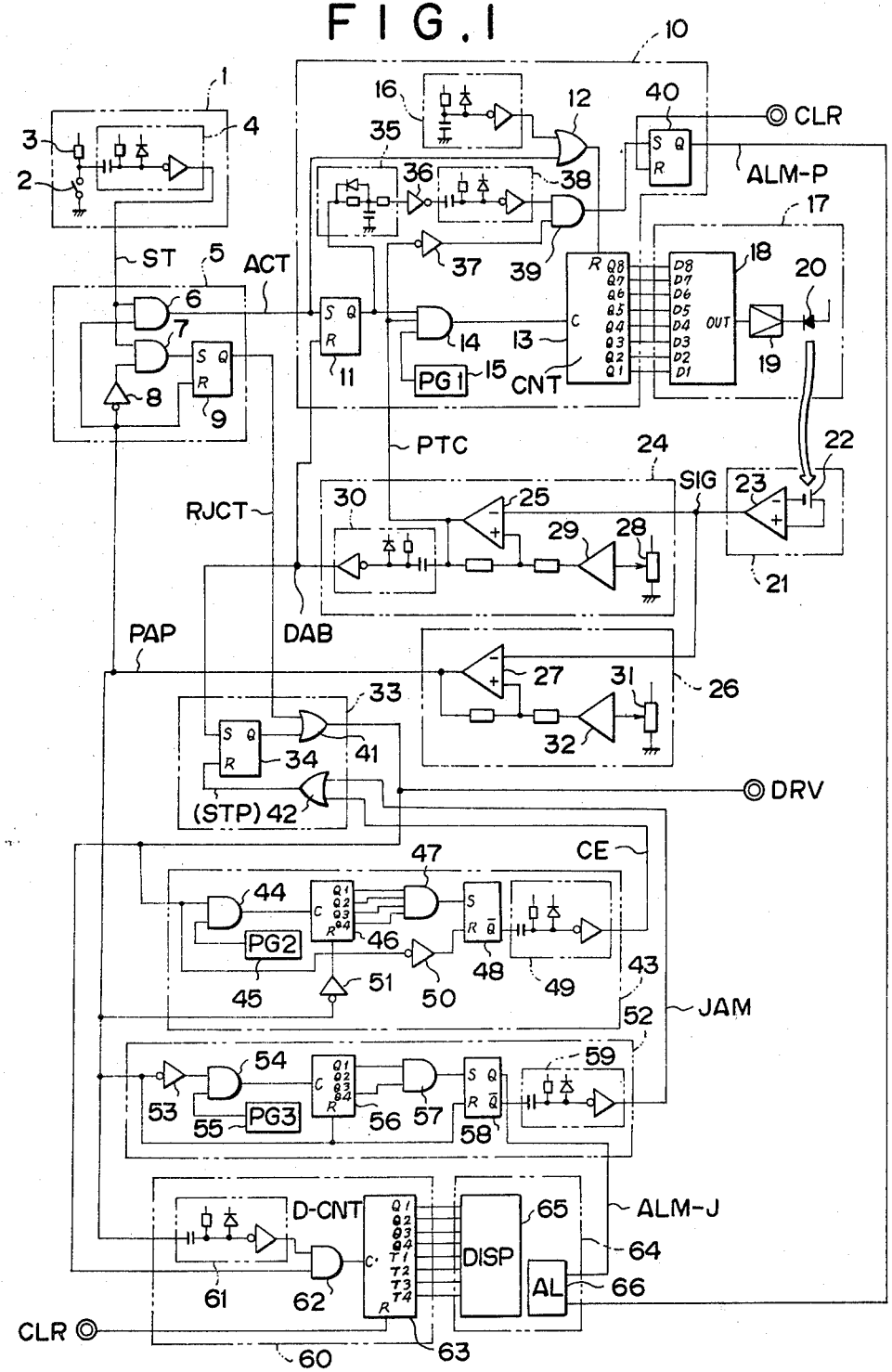
FIG. 1 is a circuit diagram showing the circuit arrangement of a bank note counting machine in which the optical detection device of this invention is incorporated.

Firstly referring to FIG. 1 showing an example of circuit arrangement of a bank note counting machine in which the optical detection device according to this invention is incorporated, a starting signal generating means for instructing the counting operation of the machine to start is provided and denoted generally by 1. Starting signal generator 1 includes a start switch 2, a pull-up resistance 3 and a differentiating circuit 4. As start switch 2 is switched on, the input terminal (at the condenser side) of the differentiating circuit 4 is shifted from binary logical level "1" to level "0", whereupon a start signal ST (positive pulse signal) is delivered from the output terminal thereof (at the inverter side) to AND gates 6 and 7 of a discriminator 5.

Discriminator 5 judges whether any previously handled bank note is jammed in the bank note passage and selects start signal ST from starting signal generator 1. Discriminator 5 detects any abnormal state, such as for instance, the fact that a bank note is jammed, as indicated by a counting signal PAP taking level "0" so that an inverter 8 delivers the signal of "1" level to AND gate 7. Thus, start signal ST from the starting signal generator 1 is applied to an S terminal of an SR type flip-flop (hereinafter referred to as SRFF) 9, whereupon SRFF 9 is set, i.e. the level of the terminal Q is set to Q="1". Also, a PAP signal of level "0" disables AND gate 6 to inhibit the ACT signal. On the other hand, under normal operation, counting signal PAP takes level "1" so that the actuation signal ACT is fed through the S terminal of another SRFF 11 of a control 10 and also fed through an OR gate 12 to an R terminal of a counter 13 of a control 10.

Control 10 serves to allow the light emitting element to emit the maximum quantity of light when a power source is swithced in, and also serves to apply a base clock signal from a pulse generator (PG 1) 15 through an AND gate 14 until the quantity of light received by the light receiving element reaches a constant level when the actuation signal ACT is input to set SRFF 11. The power source is firstly switched in, then a positive pulse signal is applied from a differentiating circuit 16 through OR gate 12 onto the R terminal of counter 13, whereupon all of the output terminals $Q_1$ to $Q_8$ of counter 13 take the level "0", and these "0" level signals are supplied to a DA(digital/analog) converter 18 of a light emitting circuit 17.

Light emitting circuit 17 also includes an amplifier 19 and a light emitting element 20, such as a light emitting diode.

DA converter 18 is composed of an IC of hybrid or monolithic type for converting a digital signal into an analog signal, and the analogy signal thus obtained is fed to light emitting element 20 after being amplified by amplifier 19. At this time, the quantity of light emitted from the light emitting element 20 is set to the maximum value in response to the signals from counter 13 having its all output terminals maintained at the "0" level. As counter 13 counts up to increase the value indicated by output terminals $Q_1$ to $Q_8$, the quantity of light emitted from light emitting element 20 is stepwisely decreased from the maximum value.

Light emitting element 20 is opposed to a light receiving element 22, such as a photodiode, of light receiving circuit 21, and is spaced from the latter by the passage through which bank notes are passing. Light receiving element 22 supplies to an amplifier 23 an electric voltage corresponding to the quantity of light emitted from light emitting element 20. Light receipt signal SIG amplified by an amplifier 23 is fed to the negative input terminals of a comparator 25 of comparison circuit 24 and a comparator 27 of a counting signal forming circuit 26.

Comparison circuit 24 includes a comparator 25 for putting out a control signal PTC (PTC="1") when the quantity of light arriving at light receiving element 22 is beyond a predetermined level, namely when the light receipt signal SIG takes a value less than a predetermined value, a variable resistance 28 having a slider terminal, an amplifier 29 for amplifying the signal put out from the slider terminal of variable resistance 28, and a differentiating circuit 30 for putting out a drive enabling signal DAB (positive pulse signal) at the time when the output from the comparator 25 is changed from "1" to "0".

On the other hand, counting signal forming circuit 26 includes a variable resistance 31 for setting the critical boundary of the quantity of light for discriminating the presence or absence of bank note, an amplifier 32 for amplifying the value of the variable resistance 31, and the aforementioned comparator 27 for comparing the quantity of light received by light receiving element 22 with the pre-set value determined by variable resistance 31 to put out a counting signal PAP indicative of the presence or absence of bank note.

As the power source is first switched in, the quantity of light emitted from light emitting element 20 is set to the maximum value, whereupon the output from comparator 25, i.e. the control signal PTC, takes the level "1" and the output from comparator 27, i.e. the counting signal PAP, also takes the level "1". Then, start switch 2 is depressed to set SRFF 11 (Q="1"), whereby the clock signals from pulse generator (PG 1) 15 applied on the AND gate 14 are passed to counter 13. Counter 13 continues counting until the quantity of light received by light receiving element 22 is lowered to the pre-set value. When the quantity of light received by light emitting element 22 is lowered to the pre-set value, the control signal PTC of comparator 25 is changed from "1" to "0" to stop the counting operation of counter 13. At this time, the drive enabling signal DAB from differentiating circuit 30 is applied to the R terminal of SRFF 11 to reset SRFF 11 and the S terminal of another SRFF 34 of supply control circuit 33 to set SRFF 34. In the control 10, when the drive enabling signal DAB is not put in within a predetermined time period after the actuation signal ACT has been put in, i.e. when the maximum quantity of light initially received by light receiving element 20 does not reach the predetermined quantity of light, an alarm signal ALM-P is generated from a delay circuit 35, inverters 36 and 37, a differential circuit 38, an AND gate 39 and an SRFF 40 indicating that the received light is far below the level which can be compensated.

On the other hand, a driving signal DRV is fed from supply control circuit 33 through an OR gate 41 when SRFF 34 is set. The bank notes to be counted are supplied successively one by one along with the feeding of this driving signal DRV, and pass through the passage between light emitting element 20 and light receiving element 22. Counting signals PAP are generated from the comparator 27 each time bank notes pass between the light emitting and light receiving elements.

From this counting signal PAP, three kinds of information, namely information relating to counting of the bank notes, information relating to monitoring of the traveling bank notes (occurrence of jamming) and information relating to termination of supply of bank notes, are supplied.

Detection circuit 43 for detecting termination of counting is provided to detect completion of supply of the bank notes, whereby the base clock signals from a pulse generator (PG 2) 45 are applied to a counter 46 when the driving signal DRV is supplied to an AND gate 44. After counter 46 has counted a predetermined number, i.e. after the lapse of a predetermined time, all of the input terminals of AND gate 47 take the level "1", whereupon SRFF 48 is set. The $\overline{Q}$ terminal of the SRFF 48 is fallen-down so that a differentiating circuit 49 puts out a counting termination signal CE which is fed through OR gate 42 to the R terminal of SRFF 34. SRFF 34 changes the driving signal DRV from "1" to "0" to stop the driving, whereupon a signal of "1" level is fed to the R terminal of SRFF 48 through an inverter 50, and the SRFF 48 is reset. The counting signal PAP takes the "0" level at every passing of a bank note, and this "0" level signal is applied to the R terminal of counter 46 through another inverter 51 to reset counter 46.

Jamming detection circuit 52 is provided to monitor the traveling condition of the bank notes. When jamming occurs, the counting signal PAP retains the level "0". Under this condition, the output of the level "1" from the inverter 53 is applied on an AND gate 54, and the clock signals from a pulse generator (PG 3) 55 are supplied through AND gate 54 to a clock terminal of a counter 56. Since this counter 56 has an R terminal on which the signal of "0" level is applied under the condition, it begins to count or clock when the counting signal PAP takes the level "0". After the counter 56 has counted a predetermined number, namely after the lapse of predetermined time, all inputs fed to an AND gate 57 take the level "1" to set an SRFF 58, whereupon the output from the $\overline{Q}$ terminal of the SRFF 58 drops to issue a jamming signal JAM so as to reset SRFF 34 through a differentiating circuit 59 and at the same time to generate an alarm signal ALM-J.

Thus, the operation of the machine is stopped and an alarm signal is displayed when jamming of traveling bank note occurs. As start switch 2 is depressed again, SRFF 9 is set since the counting signal PAP takes the level "0" due to jamming of bank note, whereupon the output from the SRFF 9 is delivered through the OR gate 41 as the driving signal DRV. When jamming is released, the counting signal PAP takes the level "1" to reset SRFF 9 so that delivery of the driving signal DRV is stopped. When a bank note passes under normal condition, counter 56 is reset before SRFF 58 is set by the signal from counter 56.

In a counting circuit 60, a counting signal PAP is applied through a differentiating circuit 61 onto an input terminal of an AND gate 62, and the driving signal DRV of "1" level is applied on the other input terminal of the AND gate 62. Counting circuit 60 is thus brought to the state of being capable of counting, and a pulse generated at the fallen time of the counting signal PAP is supplied to a C terminal of a four-digit counter 63 of dynamic scan type (composed of an integrated circuit). The result of the counting is displayed on a numerical display 65 such as seven-segment LED or LCD or a plasma display included in a display device 64. The display device 64 also has an alarm display 66 for displaying the aforementioned alarm signals ALM-P and ALM-J by means of light emitting elements.

The operation of the aforementioned circuit will now be described with reference to FIGS. 2 and 3.

Figure 2A:
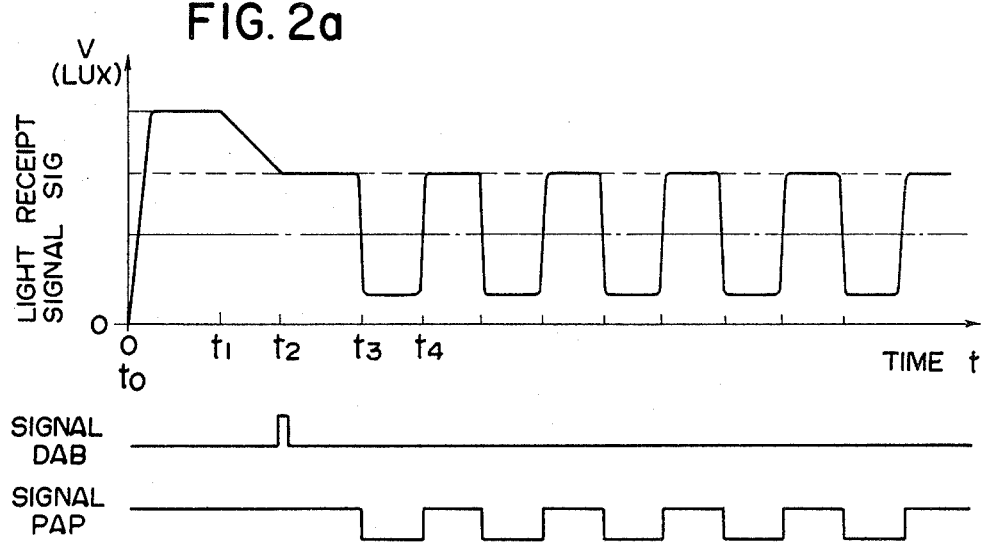
FIGS. 2 (a) and (b) are views showing the wave forms which are given to illustrate the operation of the optical detection device of this invention.
Figure 2B:
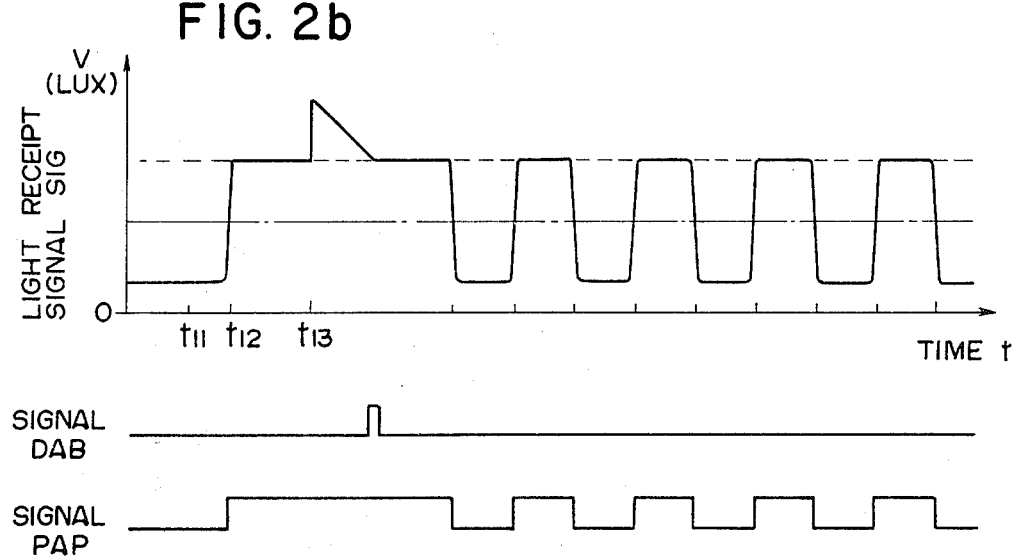
Figure 3A:
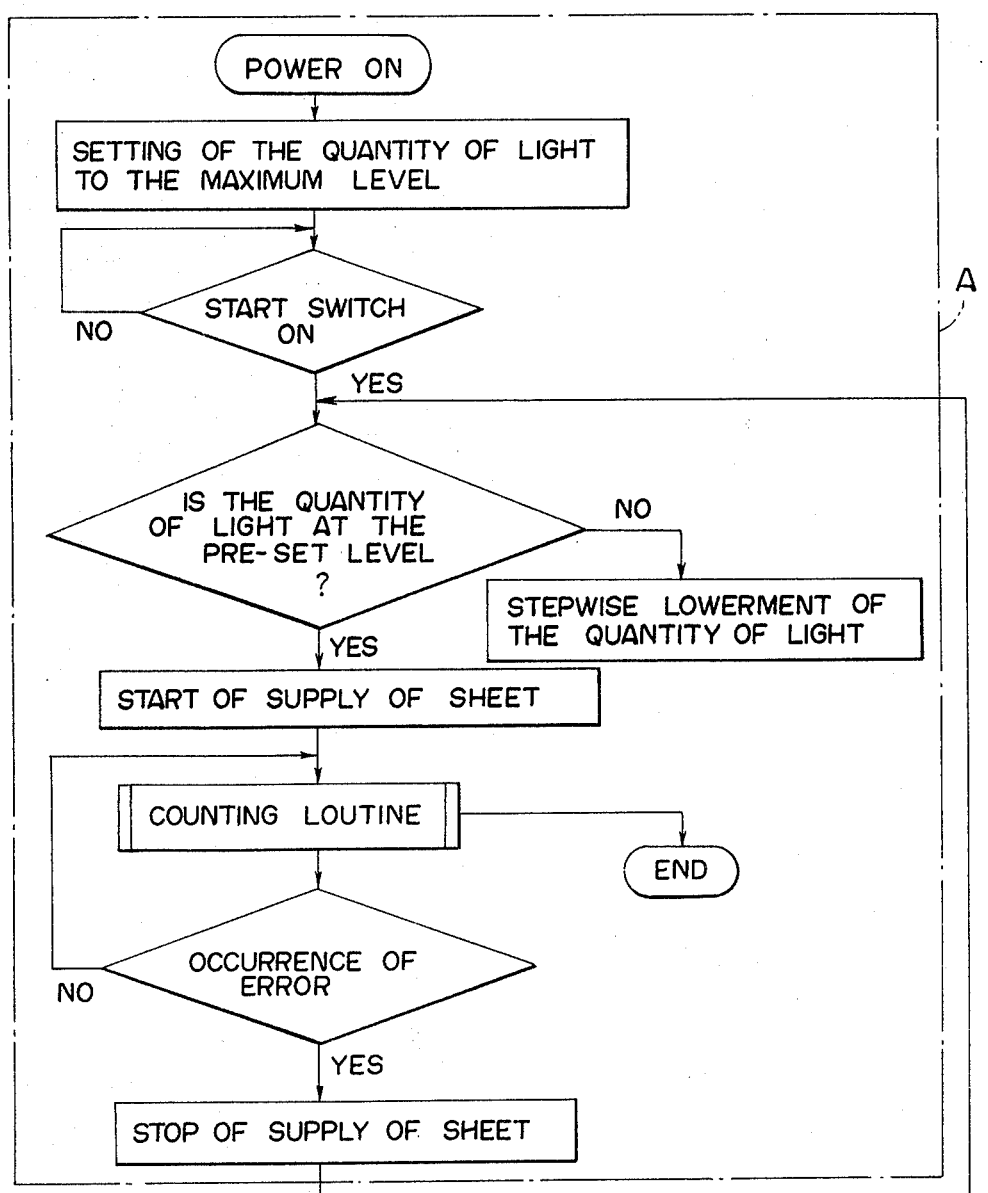

FIGS. 2(a) shows a wave form when the bank notes are supplied under normal condition, with the wave form corresponding to the portion of the flow chart of FIG. 3 encircled by a dash-and-dot line denoted by A. FIG. 2(b) shows a wave form when any bank note has become jammed, with the wave form corresponding to the portion of the flow chart of FIG. 3 encircled by a dash-and-dot line denoted by B.

Firstly, a description will be given by referring to FIG. 2(a). When the power source is switched in at the time $t_0$, the quantity of light of light emitting element 20 is set to the maximum value. Light receiving element 22 passes a light receipt signal SIG corresponding to the maximum quantity of light to comparators 25 and 27, whereupon the control signal PTC and the counting signal PAP take the level "1". An operator then places a bundle of bank notes to be counted in a container section, and depresses start switch 2 at time $t_1$, whereupon SRFF 11 is set, and the quantity of light emitted from the light emitting element 18 is decreased step-widely from the maximum value. At time $t_2$, the quantity of light received by light receiving element 22 reaches the predetermined value to reset SRFF 11 so that the quantity of light received by the light receiving element 22 while no bank note passes through the detection device is adjusted to a constant value. Simultaneously, the drive enabling signal DAB is put out to set SRFF 34 and to generate the drive signal DRV. The first bank note placed in the container section is paid out, and the bank note thus paid begins to pass through the passage between light emitting element 20 and light receiving element 22 at time $t_3$ and is counted at that time, and the trailing end of the bank note has completes passage past the detection point at time $t_4$. During this period when the passing bank note is sensed by the detection device, counting signal PAP continues to take the level "0". The time period set by counting termination detecting circuit 43 is longer than the time interval from time $t_2$ to time $t_3$. Also, the time period set by jamming detection circuit 52 is longer than the time interval from time $t_3$ to time $t_4$. As the bank notes are paid out successively one by one, the jamming detection circuit monitors whether each bank note paid out moves under normal conditions or not. After all of the bank notes placed in the container portion have been paid out and the counting operation has been completed under normal condition, counting termination detecting circuit 43 generates a counting termination signal CE, which is fed to SRFF 34 to reset same and driving signal DRV is ceased.

Next, referring to FIG. 2(b), if jamming occurs in counting operation, SRFF 34 is reset by jamming detection circuit 52 to cease the driving signal DRV. At the same time, this condition is displayed by generating an alarm signal.

Assuming now that the start switch 2 is depressed at time $t_{11}$, SRFF 9 is set to generate the driving signal DRV, since the counting signal PAP takes the level "0" at that time. The bank note which has been jammed is removed at time $t_{12}$ by the operation responsive to the driving signal DRV, whereupon the counting signal PAP is changed to "1" to reset SRFF 9 and simultaneously to reset SRFF 58 thereby to erase the alarm display. Start switch 2 is again depressed at time $t_{13}$. Light emitting element 18 is again set to the maximum quantity of light, and the operation as shown by FIG. 2(a) is thereafter repeated.

Although the device of this invention is applied for the handling of bank notes which are supplied at predetermined intervals and passed at a constant speed in the embodiment described hereinabove, the optical detection device according to this invention may be used for counting any materials passed at predetermined intervals and at a constant speed.

It is believed that many advantages of this invention will now be apparent to those skilled in the art by referring to the disclosure set forth above. By the provision of the optical detection device of this invention, the quantity of light sensed by the light receiving element can be maintained at a constant level irrespective of changes in quantity of light incident thereon due to any causes including adhesion of dust, change in quantity of light emitted from the light emitting element, accidental receipt of light from an external source other than the light emitting element and changes in performance characteristics of the light emitting element depending on change in environmental temperature. It will also be apparent to those skilled in the art that various modifications of changes may be made in this invention without departing from the spirit and scope thereof. Accordingly, the foregoing description is to be construed as illustrative only, rather than limiting. This invention is limited only by the scope of the appended claims.

What is claimed is:

1. An optical detection device for use in a bank note counting apparatus that performs a counting operation, said device comprising a light emitting circuit for emitting a quantity of light, a light receiving circuit for receiving the light emitted from said light emitting circuit, a comparator for comparing the intensity of light received by said light receiving means with a pre-set level to generate an output signal instructing stepwise lowering of the power of said light emitting circuit, and a control circuit for stopping the lowering of the power of said light emitting circuit when said light intensity reaches said pre-set level.

2. An optical detection device as set forth in claim 1, further comprising a jamming detection circuit for detecting occurrence of jamming based on the signal generated from said comparator to stop the counting operation.

3. An optical detection device as set forth in claim 2, wherein said jamming detection circuit generates an alarm signal in response to the occurrence of jamming thereby to actuate a display device for displaying an alarm indication in response to said alarm signal.

4. A constant intensity light setting device for use in bank note counting apparatus in which bank notes are counted by transmission of light through bank notes, which device comprises a light emitting circuit for emitting a quantity of light, power changing circuit connected to the light emitting circuit for stepwisely lowering the power supplied to the light emitting circuit thereby to decrease the intensity of light emitted by the light emitting circuit, a light receiving circuit for receiving the light emitted from said joint emitting circuit, a comparator for comparing the intensity of light received by the light receiving circuit with a pre-set level to generate an output signal when the intensity of light becomes less than the pre-set level, and a control circuit connected to the power changing circuit for stopping the lowering of the power supplied to the light emitting circuit thereby to maintain the intensity of light emitted from the light emitting circuit at a constant level corresponding to the pre-set level determined by the comparator.

5. A device as set forth in claim 4 wherein the power changing circuit comprises a pulse generator for generating clock pulses, a counter connected to the pulse generator for counting the clock pulses generated by the pulse generator thereby to generate a digital output signal, and a digital-analog converter connected to the counter for converting the digital output signal to an analog signal.

* * * * *